United States Patent [19]

Pighin et al.

[11] 3,888,784

[45] June 10, 1975

[54] ELECTROCHEMICAL LUMINESCENT COMPOSITION

[75] Inventors: Albert Pighin; Douglas Peter Malanka, both of Ottawa, Ontario, Canada

[73] Assignee: Northern Electric Company Limited, Montreal, Quebec, Canada

[22] Filed: Nov. 29, 1972

[21] Appl. No.: 310,249

[52] U.S. Cl. ... 252/188.3 CL; 252/301.2 R; 240/2.5
[51] Int. Cl. .................................................. C09k 3/00
[58] Field of Search ............ 252/188.3 R, 188.3 CL, 252/301.2 R; 240/2.25

[56] References Cited
UNITED STATES PATENTS

| | | | |
|---|---|---|---|
| 3,213,440 | 10/1965 | Gesteland et al. | 252/188.3 CL |
| 3,677,957 | 7/1972 | Maulding | 252/188.3 CL |

*Primary Examiner*—Stephen J. Lechert, Jr.
*Attorney, Agent, or Firm*—Sidney T. Jelly

[57] ABSTRACT

The stability of electrochemical luminescent devices is improved, to an extent that commercially feasible devices can be made, by processing the solution constituents to a high purity and in particular to remove oxygen and moisture.

10 Claims, No Drawings

ELECTROCHEMICAL LUMINESCENT COMPOSITION

This invention relates to electrochemical luminescent devices, and particularly to such devices having long stable lives.

Electrochemical luminescence, hereinafter referred to as ECL for brevity, is a means for converting electrical energy into light, at low voltages. While ECL has been known for some time, instability—resulting in a short operating life—has restricted its application, remaining principally of laboratory interest.

There are certain factors which affect the acceptability of an ECL cell as a light source. One of these is stability—that is useful life of a cell, and another is luminance—that is brightness.

The present invention is concerned particularly with the stability of ECL devices. ECL is produced at one or more electrodes immersed in, or otherwise in contact with, a solution having three components: a solvent, an electrolyte and a fluorescor. Present ECL devices, usually referred to as "cells," often have a useful life —or stable period— of an hour or less. Even during this period the luminance does not remain constant but decreases slowly. Considerable experimentation has been done in attempts to improve the stable life period of ECL cells, but only with little success. Thus, while offering a potentially simple and economic means for producing light which would have many applications, particularly in view of small power requirements, such cells are still mainly of laboratory interest.

It is thought that improvements in cell stability have not been achieved because of the interaction of the various components of the solution. The present invention produces solutions for ECL cells which give extremely long stable lives, cells using solutions in accordance with the present invention have been operated for over 4,000 hours continuously, and for similar periods intermittently, and at the ends of these times the cells were apparently capable of operation for further extended periods without significant variation in light output.

The solutions, in accordance with the present invention, are prepared from raw materials which are processed to very high degrees of purity and in particular to have very low values for moisture and oxygen content.

It is preferable to prepare all components to have the desired high degree of purity, although this is not essential. The preparation can be carried out in two ways; (i) in a batch-type process in which the components are prepared in the correct relative amounts to make up a predetermined amount of solution, the components prepared and then mixed in a substantially continuous process; (ii) preparing each component separately in predetermined amounts, the prepared components stored separately under controlled conditions until required for mixing. Once prepared, both separate components and solution must be stored in dry, oxygen free, conditions.

A generalized typical example of the preparation of a solution comprised of a solvent, electrolyte and fluorescor is as follows: The solvent can be a single solvent such as acetonitrile (ACN); benzonitrile (PhCn); or N-N'-Dimethylformamide (DMF), or a mixture of one of these solvents and an additive such as Benzene, Toluene or Xylene. Solvents can be referred to generally as aprotic solvents, that is solvents which do not produce protons. A typical electrolyte is tetra-n-butylammonium perchlorate (TBAP) and a typical fluorescor is rubrene. For a mixed solvent the individual members are each prepared in a similar manner and then mixed under controlled conditions to exclude $O_2$, and particularly water.

The solvent is prepared by taking raw material of the highest quality readily available commercially and processing it, for example using Linde molecular sieves type 4A or 5A in a dry box. The moisture content of the solvent is reduced by these sieves to below 1 part of $10^5$. The oxygen content is reduced to below 5 parts in $10^5$. If the solvent is to be used immediately for making a solution it is retained in the dry box. For keeping for later use it is put into a container while in the dry box and stored under similar conditions, as explained later.

The electrolyte is again prepared for normal commercially available material. The raw material usually contains $H_2O$ and also undesirable impurities arising from the process by which the electrolyte is manufactured. Thus the electrolyte can contain residual material carried over from the starting product. To purify the material it is dissolved for example in pure alcohol and then recrystallized. Activated carbon black can be added to the dissolved raw material to take out impurities by surface absorption. The crystals thus produced have a considerably reduced water content and they are vacuum dried at a temperature of about 140°–160°C. By dissolving in alcohol, the affinity of alcohol for water assists in reducing the amount of water retained by the crystals. The drying of the crystals, as stated, is under vacuum, and what atmosphere there is is nitrogen. The temperature at which the crystals are dried is considerably higher than that conventionally used and is believed to be one of the reasons for a high purity end product. Drying can take about two hours. To obtain highest purity, the dissolving in alcohol and recrystallization is preferably repeated several times. The moisture content is reduced, for example, to below 1 part in $10^4$.

The purity of the fluorescor is very important. Fluorescors used in previous and present ECL devices have been very impure, containing electrochemically unstable impurities. These impurities react with the other constituents of the solution, reducing the effectiveness of the cell. Methods proposed in the literature for purifying fluorescors have not produced acceptable materials for stable cells. Also they are uneconomic and give low yields. In the present example the fluorescor is dissolved in hot high quality xylene, the hot mixture then added to methanol, at room temperature. The dissolved fluorescor may be filtered before adding to the methanol. The fluorescor crystallizes while the impurities remain in the solution. Again this dissolving and crystallizing process is preferably repeated for the highest quality end product, removing the majority, if not all, of the electrochemically unstable impurities. Preferably the crystals are dried —in a nitrogen stream— after each crystallization. Care should be taken in exposing the material to light as it is light-oxidizable.

A system which has shown considerable practicality consists of rubrene in tetra-n-butylammonium perchlorate (TBAP) -1:1 benzene; N,N'-dimethylformamide (DMF). The preparation of this solution in volumetric glassware is described in more detail.

Attempts to purify rubrene by the vacuum sublimation technique resulted in a poor yield of a product that was contaminated by thermal degradation products which accompany the sublimation. Zone-refining the rubrene has not proved successful as the heat again caused thermal decomposition of the commercially available material.

In the present example, fluorescor is dissolved in a solvent, filtered, and recrystallized. Thus, for rubrene, the rubrene was dissolved in hot xylene (60ml/gm) and the hot solution filtered into cold methanol (at room temperature). The product which recrystallized from the xylene-methanol was separated from its liquor by filtration, redissolved and recrystallized a few more times, and finally vacuum dried in 1mm Hg of nitrogen for at least 2 hours at 140°–160°C. The dried product was stored in a dry nitrogen atmosphere. This procedure is further improved by excluding light and oxygen from the dissolving-recrystallizing steps as rubrene is photooxidized. Conveniently the dissolving-recrystallizing steps are carried out in a darkened room and nitrogen blown over the solution. The xylene and methanol themselves are very pure (as determined by vapour phase chromatography). The purest commercial xylene and methanol available (99+ Mole %) were outgassed and dried with Linde type 5A molecular sieves prior to their use. The glassware was cleaned and vacuum heated before use.

The recrystallized product can be identified to be rubrene by its fluorescence spectrum in DMF. The fluorescent impurities in the starting material are not present in the purified rubrene. The original raw material began to melt at 225°C and on standing at 300°C it decomposed. However, after purification, rubrene was found to have a melting point range of 335.5°–337.0°C and was thermally stable. The yield is typically 50%.

The procedure in its entirety can also be applied to the purification of other fluorescors, such as 9,10-diphenylanthracene.

TBAP has been reportedly purified by either washing with water until neutral or recrystallization from ethanol-water and then vacuum heating at below 100°C. It is believed that these procedures resulted in water being trapped in the electrolyte which was not baked off at the vacuum temperatures used. In the present example, these shortcomings were overcome, by recrystallizing the TBAP from absolute ethanol and then vacuum drying it at 140°–160°C for at least 2 hours in 1mm Hg nitrogen. Specifically, the as-received TBAP is dissolved in boiling absolute ethanol (6ml/gm), nitrogen being continuously passed over the solution. Then carbon black is added to remove a pale yellow colour from the solution. The hot solution is filtered and allowed to cool to recrystallize the TBAP. The mother liquid is then decanted and the crystals redissolved-recrystallized at least twice more. Finally, the TBAP is dried first via suction filtration and then by vacuum heating. The purified and dried product is stored and used in a dry nitrogen atmosphere. Excessive and prolonged vacuum heating of the TBAP, for exmple at 220°C, decomposed it. About 70% yield is obtained. The glassware was cleaned and vacuum heated before use.

The original material melted between 205°–207°C while the purified product has a melting point of 214.5°–217°C. When 0.2M TBAP was added to acetonitrile no increase in the water content of the solution was detectable with a sensitivity of 10ppm. The procedure can also be successfully applied to the purification of other alkyl perchlorates, such as tetraethylammonium perchlorate.

Attempts to purify the aprotic solvents by known methods, involving the addition of selective reagents to the solvents which would modify the impurities into species which could then be separated by distillation, did not prove suitable for the purification of DMF because it is decomposed by the high temperatures required for distillation (even under reduced pressure), especially in the presence of the added reagents (its hydrolysis is catalyzed by acids and bases). The Cupric ion method of Visco [R. E. Visco, Abstract 134, Mtng, Am. Chem. Soc., May (1969)] and preparative scale vapour phase chromatography produced acceptable products but the product was no better than that of a 4A or 5A molecular sieve dried product. The latter is more simple and less wasteful. The 4A/5A molecular sieves apparently absorb water, formic acid and formaldehyde, all very undesirable impurities in an ECL system. Residual impurities apparently do not interfere with the ECL. Starting with commercial grade DMF, the dried product can be as much as 99.9996% pure. Benzonitrile is another commercially available aprotic solvent that may only require drying prior to its satisfactory use in ECL systems. Acetonitrile, however is purified by refluxing it with aqueous KOH to polymerize its unsaturated nitrile impurities. After distilling the acetonitrile, it can then be dried with the 4A/5A molecular sieves to yield a useful solvent. Benzene, toluene and the xylenes can be successfuly "purified" by drying their purest commercial products with 4A/5A molecular sieves.

After preparation, as stated above, the raw material end products can either be combined immediately to produce the solution or the products put into containers for storage. When used to prepare a solution immediately it is usual to prepare enough of each product, or component, to produce a predetermined amount of solution. The solvent is dried in the dry box, being held in a suitable container, such as a beaker. In a mixed solvent the additive is fed to the dry box also —after purification— for final drying and then into the beaker. Then the electrolyte is prepared and passed to the dry box and mixed with the solvent. Finally the fluorescor is prepared and fed to the dry box for mixing with the solvent and electrolyte. The solution is then preferably put into a sealable container and stored in the dry box —or some similar device— until required for use.

When the end products, or components, are to be stored separately, they are fed individually to a dry box and put into sealable containers in the dry box. The containers are stored in the dry box until required. The individual components can be fed to separate dry boxes, or one dry box can be used.

The solution, after preparation, is subjected to a low pressure and stirred (agitated) to further remove any dissolved oxygen. Then, while in the sealable container the pressure is brought up to just below atmospheric with nitrogen, the container then sealed. Similar precautions are advised when storing the components separately —putting in containers, reducing pressure, raising pressure with nitrogen and then sealing.

A further feature of importance in the stability of cells is the containing structure. Cells can be made with a limited variation of materials, the most usual being ceramic or glass or a combination of both. Glass is particularly prone to having water vapour on its surface and in the surface layer. The structure material is preferably heated in a vacuum to expel the water vapour and is transferred to a dry box with a nitrogen atmosphere.

When assembling a cell precautions should be taken to avoid contamination by oxygen.

What is claimed is:

1. A process for preparing a solution for an electrochemical luminescent cell, the solution comprising an aprotic solvent, a fluorescor dissolved in the solvent, the fluorescor selected from rubrene and 9, 10 - diphenylanthracene, and an electrolyte, the electrolyte an alkyl perchorate;

wherein the fluorescor is dissolved in hot xylene and the resultant solution filtered while hot into methanol at room temperature to recrystallize the fluorescor, the resultant mixture then filtered to separate the recrystallized fluorescor, the dissolving, filtering into methanol, recrystallization and filteration carried out at least two times, and finally vacuum drying the recrystallized fluorescor in a nitrogen atmosphere.

2. A process as claimed in claim 1, the electrolyte prepared by dissolving in hot alcohol and recrystallizing by cooling, the recrystallized electrolyte removed from the resultant mixture, the dissolving and recrystallizing carried out at least two times, and finally vacuum drying.

3. A process as claimed in claim 2, the vacuum drying carried out in a nitrogen atmosphere.

4. A process as claimed in claim 3, the vacuum drying of the fluorescor and the electrolyte carried out at a temperature in the range of about 140° – 160°C for at least two hours.

5. A process as claimed in claim 2, including adding carbon black to the dissolved electrolyte, and filtering the resultant mixture prior to recrystallizing.

6. A process as claimed in claim 1, the aprotic solvent dried by contact with a molecular sieve.

7. A process as claimed in claim 6, the aprotic solvent one of N-N-Dimethylformamide and benzonitrile.

8. A process as claimed in claim 6, the aprotic solvent a mixture of one of N-N-Dimethylformamide and benzonitrile, and any one of benzene, toluene and xylene.

9. A process as claimed in claim 6, the aprotic solvent acetonitrile, wherein the acetonitrile is refluxed with aqueous potassium hydroxide prior to drying.

10. A process as claimed in claim 9, wherein one of benzene, toluene and xylene is added to the acetonitrile after refluxing of the acetonitrile.

* * * * *